(12) United States Patent
Skarby et al.

(10) Patent No.: US 7,120,465 B2
(45) Date of Patent: Oct. 10, 2006

(54) TRANSCEIVER SYSTEM INCLUDING MULTIPLE RADIO BASE STATIONS THAT SHARE AN ANTENNA

(75) Inventors: Ulf Skarby, Lidingo (SE); S. Patrik Lindell, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 409 days.

(21) Appl. No.: 10/743,555

(22) Filed: Dec. 20, 2003

(65) Prior Publication Data

US 2005/0136875 A1 Jun. 23, 2005

(51) Int. Cl.
*H04B 1/38* (2006.01)

(52) U.S. Cl. .................. 455/561; 455/562.1; 455/334; 455/339

(58) Field of Classification Search ................ 455/561, 455/562.1
See application file for complete search history.

(56) References Cited

U.S. PATENT DOCUMENTS

| | | | |
|---|---|---|---|
| 5,781,865 A | 7/1998 | Gammon | 455/561 |
| 6,070,090 A * | 5/2000 | Feuerstein | 455/561 |
| 6,658,263 B1 * | 12/2003 | Ke et al. | 455/524 |
| 6,792,289 B1 * | 9/2004 | Judson | 455/562.1 |
| 6,804,540 B1 * | 10/2004 | Shepherd et al. | 455/562.1 |
| 6,895,247 B1 * | 5/2005 | Mostafa | 455/448 |
| 6,925,312 B1 * | 8/2005 | Skarby | 455/561 |
| 2003/0068998 A1 * | 4/2003 | Yamakawa et al. | 455/339 |
| 2004/0052272 A1 | 3/2004 | Frank | |

FOREIGN PATENT DOCUMENTS

| | | |
|---|---|---|
| EP | 1320146 | 6/2003 |
| GB | 2281663 | 3/1995 |
| WO | WO 92/12579 | 7/1992 |
| WO | WO 9212579 | 7/1992 |

OTHER PUBLICATIONS

International Search Report PCT/SE2004/001870.

* cited by examiner

*Primary Examiner*—Duc M. Nguyen

(57) ABSTRACT

A transceiver system is described herein that has an antenna coupled to a filter unit which is coupled to multiple radio base stations (RBSs). Each RBS uses one TX/RX cable and if needed a RX cable to connect to the filter unit. To enable the RBSs so they can share one antenna, each RBS has a duplex filter incorporated therein. And, the filter unit has a unique combination of diplex filter(s), duplex filter(s), part-band duplex filter(s), diplex-duplex filter(s), splitter(s) and/ or low noise amplifier(s). Four exemplary embodiments of the transceiver system are described herein to show how the filter unit can be configured so as to enable the RBSs to share one antenna even if the RBSs share the same frequency band and/or even if the RBSs operate with different radio standards (e.g., TDMA, CDMA, WCDMA and GSM). Also described herein in accordance with the present invention are: (1) a method for constructing the transceiver system; (2) a radio base station; and (3) an antenna.

36 Claims, 6 Drawing Sheets

TRANSCEIVER SYSTEM INCLUDING MULTIPLE RADIO BASE STATIONS THAT SHARE AN ANTENNA

BACKGROUND OF THE INVENTION

1. Field of the Invention

The present invention relates in general to the telecommunications field and, in particular, to a transceiver system that includes multiple radio base stations (RBSs) that can share an antenna even if the RBSs share a frequency band and/or even if the RBSs operate with different radio standards.

2. Description of Related Art

It is well known when an operator places two or more RBSs in a transceiver system or adds a new RBS to the transceiver system that the operator would like to have the RBSs share the same antenna system. An example of a traditional transceiver system with multiple RBSs that share the same antenna is briefly discussed below with respect to FIG. 1.

Referring to FIG. 1 (PRIOR ART), there is shown a block diagram of a traditional transceiver system 100 described in PCT Patent Application No. WO 92/12579. The traditional transceiver system 100 includes several base stations (BS1, BS2, BS3 ... BSn) each of which can belong to a different type of radio system such as TACS, ETACS and GSM. The base stations (BS1, BS2, BS3 ... BSn) are connected to a filter means 102 which in turn is connected to an antenna 104. The filter means 102 filters the TX signals that are sent over TX cables 106 from the base stations (BS1, BS2, BS3 ... BSn) and applies the filtered TX signals to the antenna 104. The filter means 102 also filters RX signals received by the antenna 104. The filtered RX signals are then sent to a divider unit 108. The divider unit 108 divides the filtered RX signals so that separate filtered RX signals can be sent over RX cables 110 to the base stations (BS1, BS2, BS3 ... BSn). A drawback of this particular transceiver system 100 is that each base station (BS1, BS2, BS3 ... BSn) needs to use two cables—TX cable 106 and RX cable 110—to share the antenna 104 which adds to the complexity and cost of the transceiver system 100. It should be noted that U.S. Pat. No. 5,781,865 discloses a transceiver system that is similar to and has the same drawbacks as transceiver system 100. Accordingly, there is a need for a transceiver system that addresses and solves the aforementioned drawback associated with the traditional transceiver system 100. This need and other needs are addressed by the transceiver systems of the present invention.

BRIEF DESCRIPTION OF THE INVENTION

The present invention includes a transceiver system that has an antenna coupled to a filter configuration which is coupled to multiple radio base stations (RBSs). Each RBS uses one TX/RX cable and if needed a RX cable to connect to the filter configuration. To enable the RBSs so they can share one antenna, each RBS has a duplex filter incorporated therein. And, the filter configuration has a unique combination of diplex filter(s), duplex filter(s), part-band duplex filter(s), diplex-duplex filter(s), splitter(s) and/or low noise amplifier(s). Four exemplary embodiments of the transceiver system are described below to show how the filter configuration can be configured so as to enable the RBSs to share one antenna even if the RBSs share the same frequency band and/or even if the RBSs operate with different radio standards (e.g., TDMA, CDMA, WCDMA and GSM).

The present invention described herein also includes: (1) a method for constructing the transceiver system; (2) a radio base station; and (3) an antenna.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
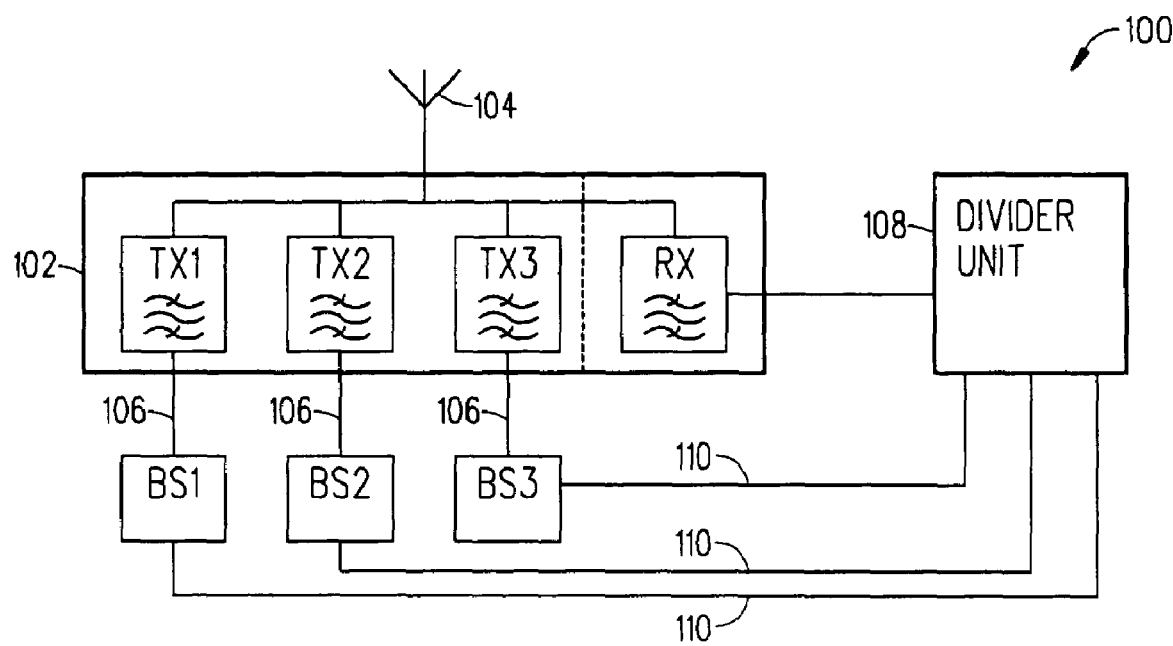
FIG. 1 (PRIOR ART) is a block diagram of a traditional transceiver system that was disclosed in PCT Patent Application No. WO 92/12579.
Figure 2:
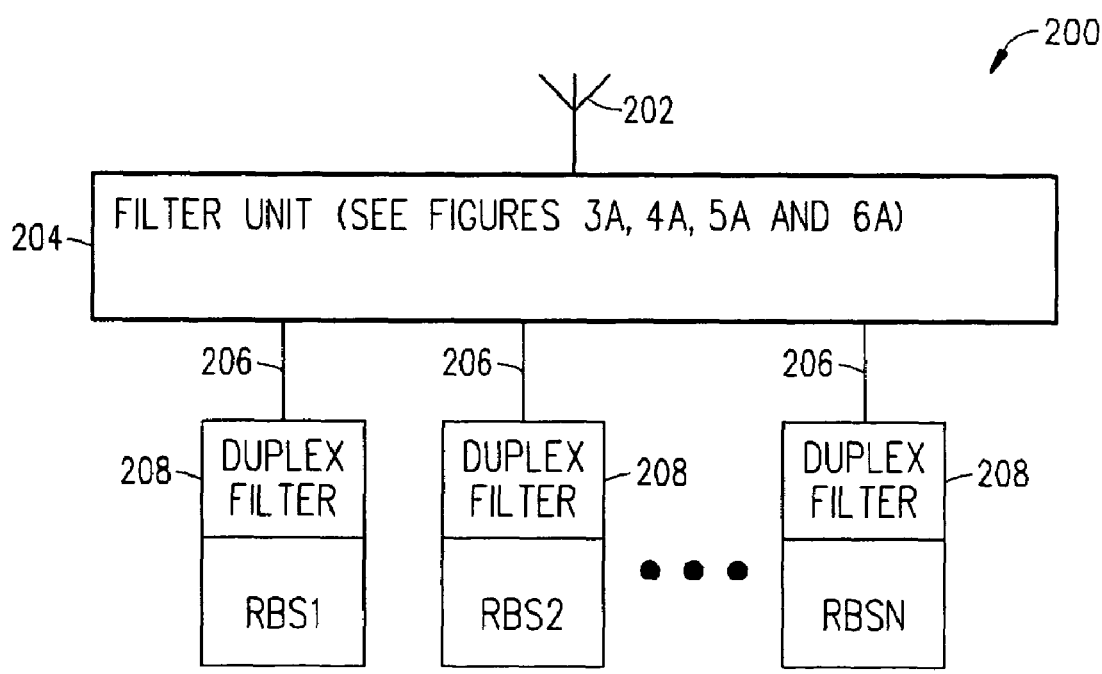
FIG. 2 is a block diagram showing the basic components of a transceiver system in accordance with the present invention.

Referring to FIG. 2, there is shown a block diagram that illustrates the basic components of a transceiver system 200 which has multiple RBSs (RBS1, RBS2 ... RBSn) that can share one antenna 202 in accordance with the present invention. As shown, the transceiver system 200 includes an antenna 202 which is coupled to a filter configuration 204 which in turn is coupled to multiple RBSs (RBS1, RBS2 ... RBSn). Each RBS (RBS1, RBS2 ... RBSn) uses one TX/RX cable 206 and if needed a RX cable 207 (see FIGS. 3A and 5A) to connect to the filter configuration 204. To enable the RBSs (RBS1, RBS2 ... RBSn) so they can share one antenna 202, each RBS (RBS1, RBS2 ... RBSn) has a duplex filter 208 incorporated therein. And, the filter configuration 204 has a unique combination of diplex filter(s), duplex filter(s), part-band duplex filter(s), diplex-duplex filter(s), splitter(s) and/or low noise amplifier LNA(s). Four different examples of how the filter configuration 204 can be configured so as to enable the RBSs (RBS1, RBS2 ... RBSn) to share one antenna 202 even if the RBSs (RBS1, RBS2 ... RBSn) share the same frequency band and/or even if the RBSs (RBS1, RBS2 ... RBSn) operate with different radio standards (e.g., TDMA, CDMA, WCDMA and GSM) are described below with respect to FIGS. 3–6.

Figure 3A:
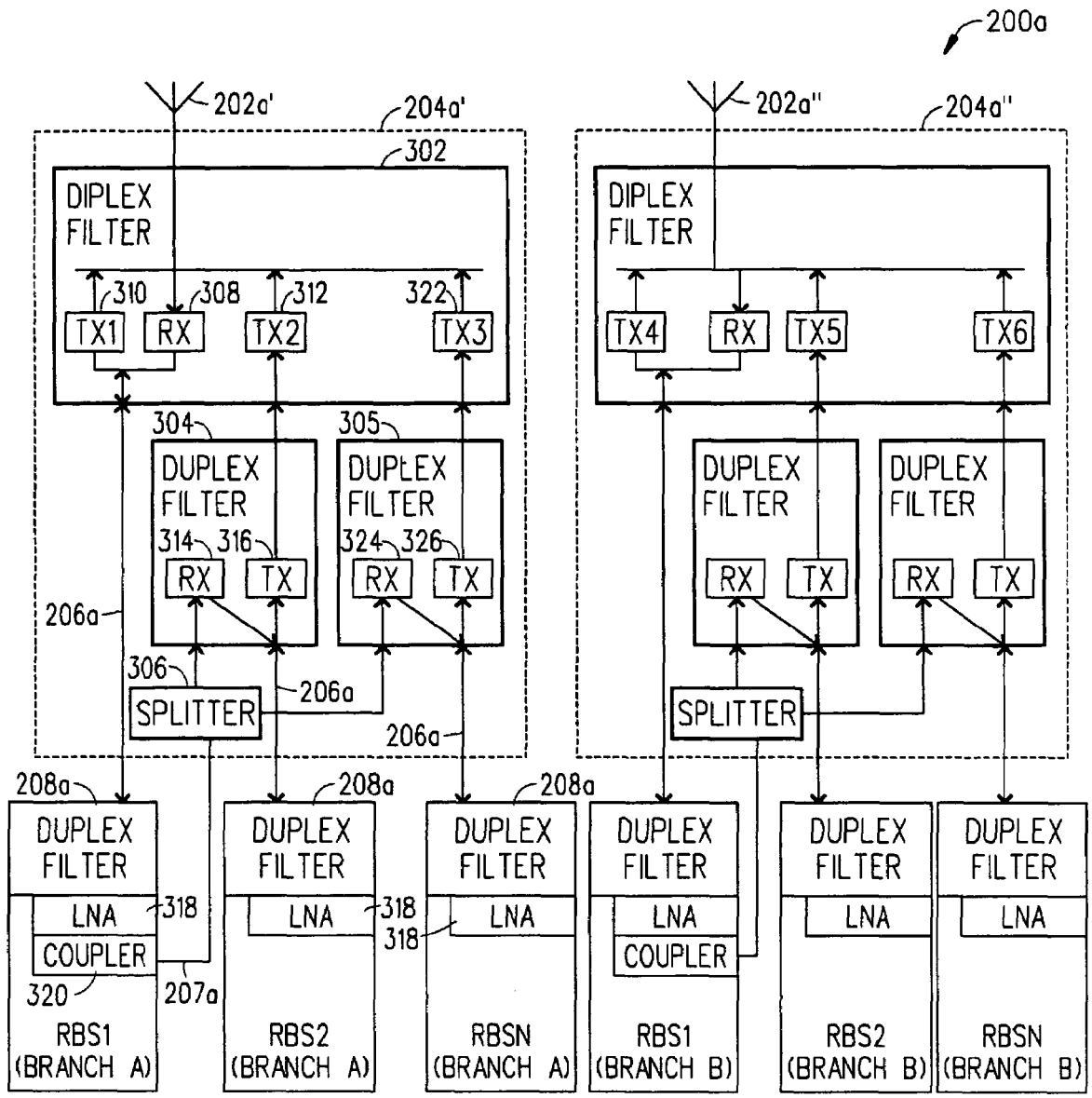
FIG. 3A is a block diagram showing the basic components of a first embodiment of the transceiver system shown in FIG. 2 in accordance with the present invention.
Figure 3B:
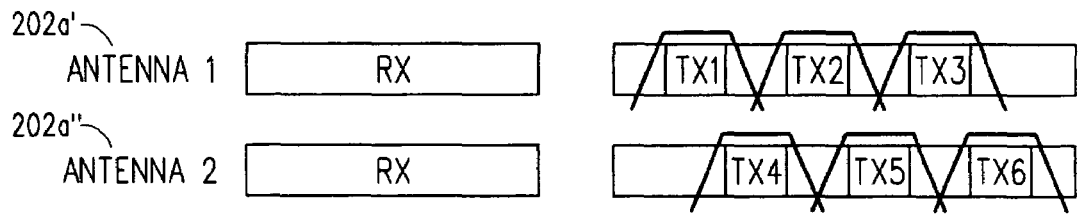
FIG. 3B is a diagram showing exemplary frequency allocations associated with the transceiver system shown in FIG. 3A in accordance with the present invention.

Referring to FIGS. 3A and 3B, there are shown two diagrams associated with the first embodiment of the transceiver system 200a in accordance with the present invention. As shown in FIG. 3A, each of the RBSs (RBS1, RBS2 ... RBSn) have two branches (branch A and branch B). This is done since the transceiver system 200a typically has three sectors and each sector normally has two separate antennas 202a' and 202a" with two separate RX branches so as to obtain the proper "RX diversity gain". The need for "RX diversity gain" comes from the fact that in nature a radio signal "bounces" on different things (e.g., buildings, mountains) and this leads to problematical multipath fading. And, one way to lower the influence of multipath fading is to install two or more antennas 202a'and 202a". The antennas 202a' and 202a" can be place 3–4 m apart from one another or the antennas 202a' and 202a"can be made to have a 90° phase difference between themselves. However it should be appreciated that this transceiver system 200a or any of the other transceiver systems described herein can also have just one branch and one antenna like was shown in transceiver system 200 (see FIG. 2).

For clarity branch A of transceiver system 200a is described first and then a brief discussion is provided about branch B which has essentially the same filter configuration as branch A. As shown in FIG. 3A, the transceiver system 200a includes an antenna 202a' which is coupled to a filter configuration 204a' that in turn is coupled to branch A of multiple RBSs (RBS1, RBS2 ... RBSn). Each RBS (RBS1, RBS2 ... RBSn) uses one TX/RX cable 206a and if needed one RX cable 207a to connect to the filter configuration 204a'. To enable the RBSs (RBS1, RBS2 ... RBSn) so they can share one antenna 202a', each RBS (RBS1, RBS2 ... RBSn) has a duplex filter 208a incorporated therein. And, the filter configuration 204a' has a unique configuration which in this embodiment includes a diplex filter 302, one or more duplex filters 304 and 305 and a splitter 306. A detailed discussion is provided next on how the filter configuration 204a' is configured so as to enable the RBSs (RBS1, RBS2 ... RBSn) to share one antenna 202a' even if the RBSs (RBS1, RBS2 ... RBSn) share the same frequency band and/or even if the RBSs (RBS1, RBS2 ... RBSn) operate with different radio standards (e.g., TDMA, CDMA, WCDMA and GSM).

Referring to the filter components associated with RBS1 and RBS2 shown in transceiver system 200a, the filter configuration 204a' includes the diplex filter 302, the duplex filter 304 and the splitter 306. The diplex filter 302 includes a full-band receiver (RX) filter 308 and two part-band transceiver (TX) filters 310 and 312. As can be seen, the full-band RX filter 308 is coupled to part-band TX1 filter 310. The duplex filter 304 includes a RX filter 314 and a TX filter 316. The TX filter 316 is coupled to the part-band TX2 filter 312 located in the diplex filter 302. The first RBS1 and in particular the duplex filter 208a incorporated therein uses a TX/RX cable 206a to connect to the full-band RX filter 308 and first part-band TX1 filter 310 in the diplex filter 302. In addition, the first RBS1 also includes a LNA 318 and a coupler 320 that interfaces with the splitter 306 via the RX cable 207a. In this way, the splitter 306 can couple a RX signal received from the full-band RX filter 308 in the diplex filter 302 to the RX filter 314 in the duplex filter 304. It should be appreciated that the splitter 306 is used if more than one RBS is co-sited in the transceiver system 200a. The second RBS2 and in particular the duplex filter 208a incorporated therein uses a TX/RX cable 206a to connect to the duplex filter 304. The RBS2 also includes a LNA 318. In view of this filter configuration, RBS1 can receive a RX signal applied to the antenna 202a' by way of the splitter 306 and transmit a TX signal within a TX1 band using the antenna 202a'. Whereas, RBS2 can receive a RX signal applied to the antenna 202a' and transmit a TX signal within a TX2 band using the antenna 202a'.

For each RBS in addition to RBS1 and RBS2 that is within or added to the transceiver system 200a, the filter configuration 204a' and in particular the diplex filter 302 would include another part-band transceiver (TX) filter 322 (shown as TX3 filter 322). The part-band TX3 filter 322 is coupled to the antenna 202a'. The filter configuration 204a' would also include another duplex filter 305. The duplex filter 305 includes a RX filter 324 and a TX filter 326. The TX filter 326 is coupled to the part-band TX3 filter 322 in the diplex filter 302. The additional RBS (shown as RBSn) and in particular the duplex filter 208a incorporated therein uses a TX/RX cable 206a to connect to the duplex filter 305. The RBSn also includes a LNA 318. In view of this filter configuration, RBSn can receive a RX signal applied to the antenna 202a' by way of the splitter 306 and transmit a TX signal within a TX3 band using the antenna 202a'. The same filter scheme associated with filter configuration 204a' is used to make filter configuration 204a" which is associated with branch B of the RBSs (RBS1, RBS2 ... RBSn) that share antenna 202a".

Referring to FIG. 3B, there is a diagram showing exemplary frequency allocations for each of the antennas 202a' and 202a" in transceiver system 200a. It is possible to see how the RBSs (RBS1, RBS2 ... RBSn) can share the same frequency band and can operate with different radio standards (e.g., TDMA, CDMA, WCDMA and GSM) simply by selecting the appropriate RX and TX filters. For instance, it can be seen that RBS1 branch A can operate on one standard using TX1 while RBS1 branch B can operate in the same or another standard using TX4. And, it can be seen that RBS1 branch A and RBS1 branch B have RX diversity because both have the same RX band. Moreover, it should be appreciated that if the RBSs (RBS1, RBS2 ... RBSn) use different standards then there must be guardbands in the frequency allocation to separate the TX bands otherwise there will be interactions between the TXs. These guardbands could be very narrow however there is going to be a tradeoff between insertion loss and guardband attenuation.

Figure 4A:
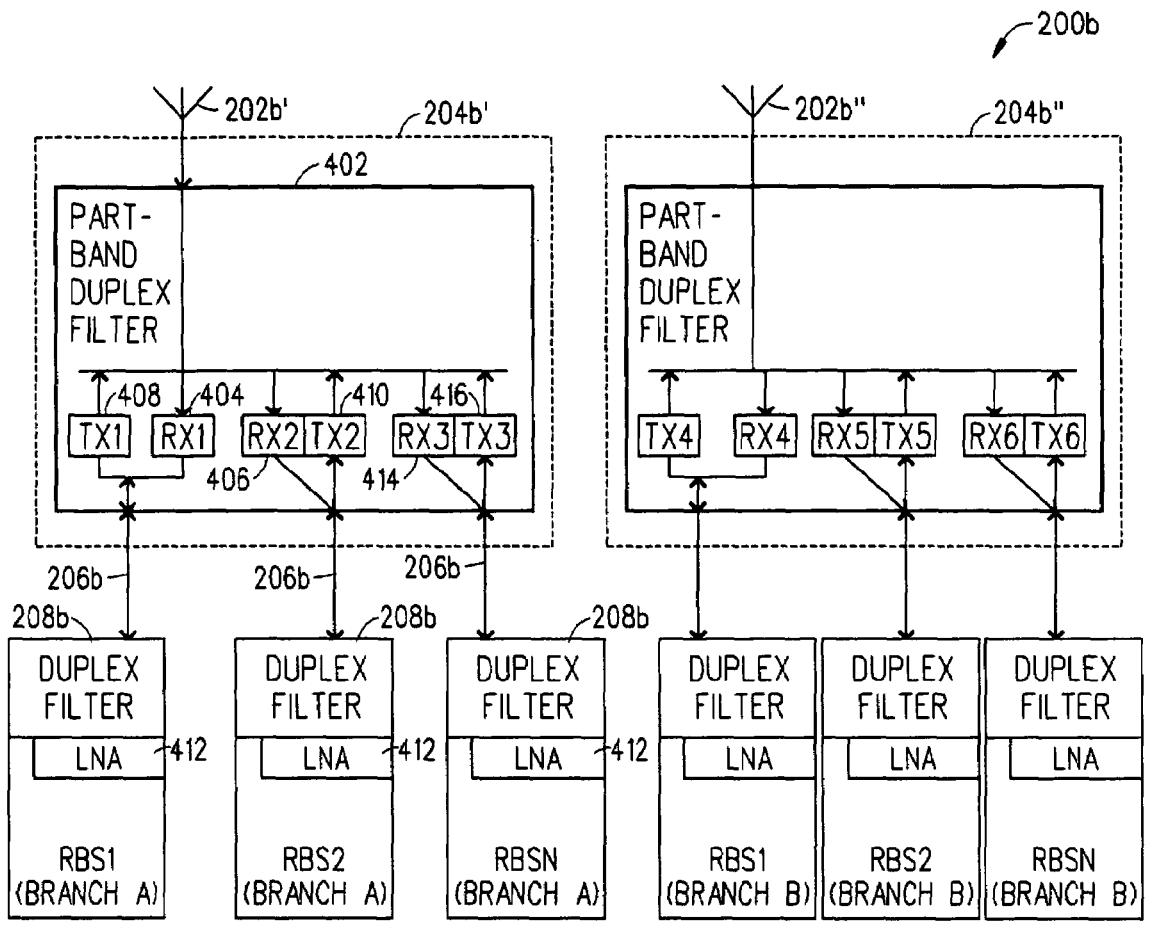
FIG. 4A is a block diagram showing the basic components of a second embodiment of the transceiver system shown in FIG. 2 in accordance with the present invention.
Figure 4B:
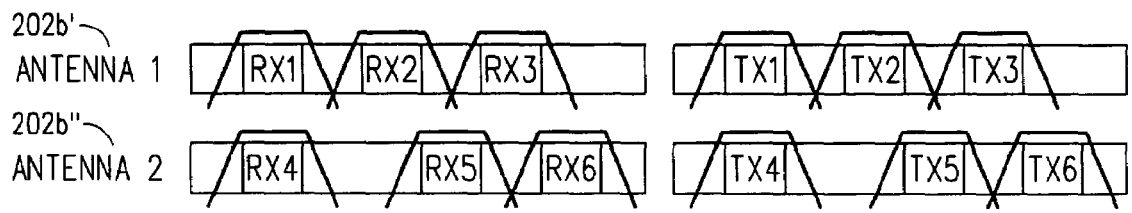
FIG. 4B is a diagram showing exemplary frequency allocations associated with the transceiver system shown in FIG. 4A in accordance with the present invention.

Referring to FIGS. 4A and 4B, there are shown two diagrams associated with the second embodiment of the transceiver system 200b in accordance with the present invention. Like in the first embodiment of the present invention, transceiver system 200b and in particular each of the RBSs (RBS1, RBS2 ... RBSn) have two branches (branch A and branch B). For clarity branch A of transceiver system 200b is described first and then a brief discussion is provided about branch B which has essentially the same filter configuration as branch A.

As shown in FIG. 4A, the transceiver system 200b includes an antenna 202b' which is coupled to a filter unit 204b' that in turn is coupled to branch A of multiple RBSs (RBS1, RBS2 ... RBSn). Each RBS (RBS1, RBS2 ... RBSn) uses one TX/RX cable 206b to connect to the filter unit 204b'. To enable the RBSs (RBS1, RBS2 ... RBSn) so they can share one antenna 202b', each RBS (RBS1, RBS2 ... RBSn) has a duplex filter 208b incorporated therein. And, the filter unit 204b' has a unique configuration which in this embodiment includes a part-band duplex filter 402. A detailed discussion is provided next on how the filter unit 204b' is configured so as to enable the RBSs (RBS1, RBS2 . . . RBSn) to share one antenna 202b' even if the RBSs (RBS1, RBS2 . . . RBSn) share the same frequency band and/or even if the RBSs (RBS1, RBS2 . . . RBSn) operate with different radio standards (e.g., TDMA, CDMA, WCDMA and GSM).

Referring to the filter components associated with RBS1 and RBS2 shown in transceiver system 200b, the filter unit 204b' includes the part-band duplex filter 402 which is coupled to the antenna 202b'. The part-band duplex filter 402 includes two part-band receiver (RX) filters 404 and 406 and two part-band transceiver (TX) filters 408 and 410. As can be seen, the first part-band RX1 filter 404 is coupled to the first part-band TX1 filter 408. And, the second part-band RX2 filter 406 is coupled to the second part-band TX2 filter 410. The first RBS1 and in particular the duplex filter 208b incorporated therein uses a TX/RX cable 206b to connect to the first part-band RX1 filter 404 and first part-band TX1 filter 408 in the part-band duplex filter 402. In addition, the first RBS1 also includes a LNA 412 which is coupled to the duplex filter 208b. The second RBS2 and in particular the duplex filter 208b incorporated therein uses a TX/RX cable 206b to connect to the second part-band RX2 filter 406 and second part-band TX2 filter 410 in the part-band duplex filter 402. The second RBS2 also includes a LNA 412 which is coupled to the duplex filter 208b. In view of this filter unit, RBS1 can receive a RX signal within a RX1 band that is applied to the antenna 202b' and transmit a TX signal within a TX1 band using the antenna 202b'. Whereas, RBS2 can receive a RX signal within a RX2 band that is applied to the antenna 202b' and transmit a TX signal within a TX2 band using the antenna 202b'.

For each RBS in addition to RBS1 and RBS2 that is within or added to the transceiver system 200b, the filter unit 204b' and in particular the part-band duplex filter 402 would include another part-band receiver (RX) filter 414 (shown as RX3 filter 414) and another part-band transceiver (TX) filter 416 (shown as TX3 filter 416). The part-band RX3 filter 414 is coupled to part-band TX3 filter 416. The additional RBS (shown as RBSn) and in particular the duplex filter 208b incorporated therein uses a TX/RX cable 206b to connect to the part-band RX3 filter 414 and part-band TX3 filter 416 in the part-band duplex filter 402. In addition, the RBSn also includes a LNA 412 which is coupled to the duplex filter 208b. The same filter scheme associated with filter unit 204b' is used make filter unit 204b" which is associated with branch B of the RBSs (RBS1, RBS2 . . . RBSn) that share antenna 202b".

Referring to FIG. 4B, there is a diagram showing exemplary frequency allocations for each of the antennas 202b' and 202b" in transceiver system 200b. It is possible to see how the RBSs (RBS1, RBS2 . . . RBSn) can share the same frequency band and can operate with different radio standards (e.g., TDMA, CDMA, WCDMA and GSM) simply by selecting the appropriate RX and TX filters. For instance, it can be seen that RBS2 branch A can operate on one standard using TX2 while RBS2 branch B can operate in the same or another standard using TX5. And, it can be seen that RBS2 branch A and RBS2 branch B do not have RX diversity because both have different RX bands where RX2 does not match RX5.

Figure 5A:
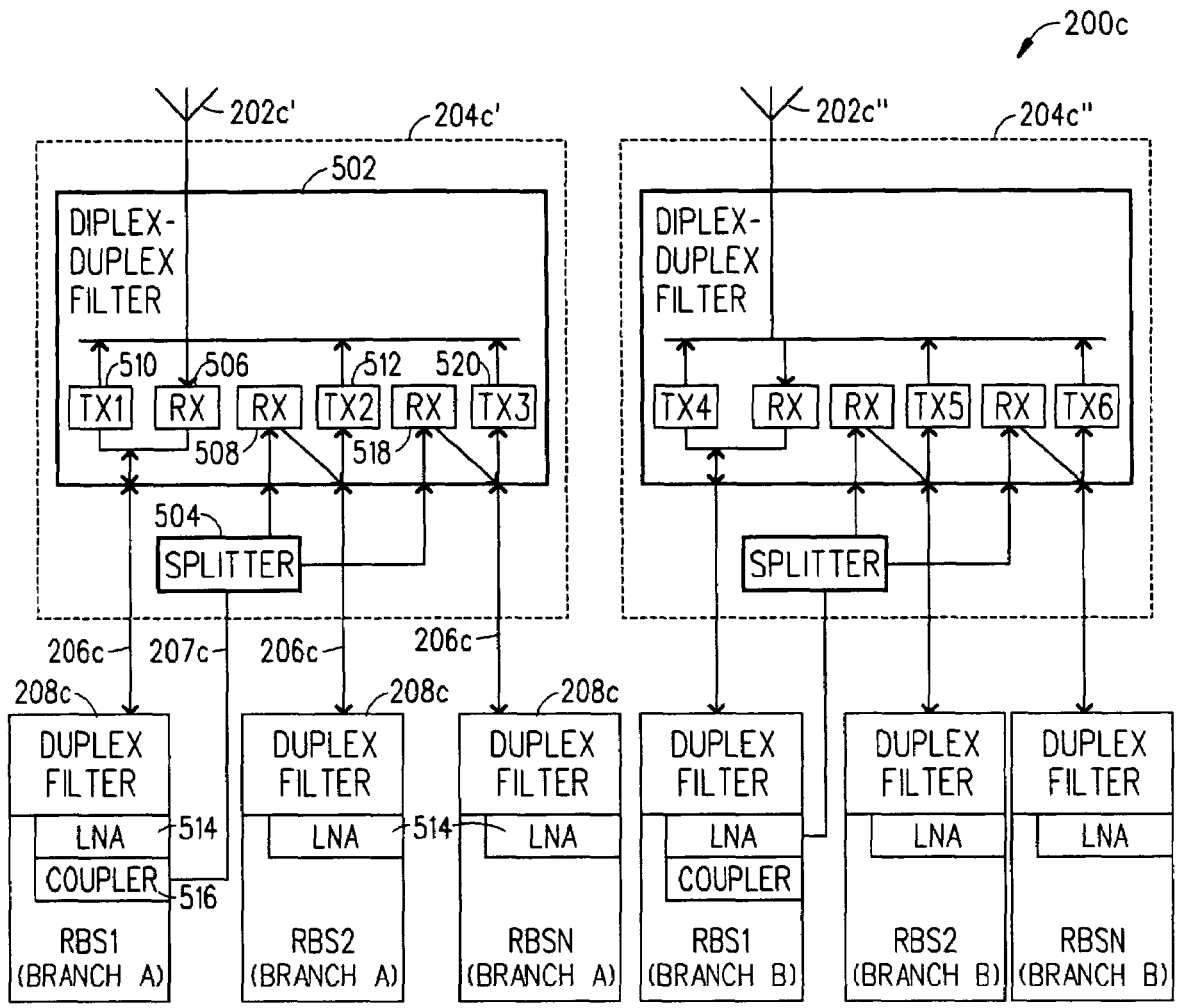
FIG. 5A is a block diagram showing the basic components of a third embodiment of the transceiver system shown in FIG. 2 in accordance with the present invention.
Figure 5B:
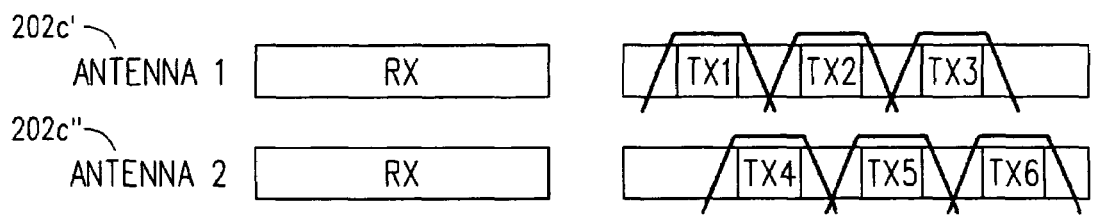
FIG. 5B is a diagram showing exemplary frequency allocations associated with the transceiver system shown in FIG. 5A in accordance with the present invention.

Referring to FIGS. 5A and 5B, there are shown two diagrams associated with the third embodiment of the transceiver system 200c in accordance with the present invention. Like in the first two embodiments of the present invention, transceiver system 200c and in particular each of the RBSs (RBS1, RBS2 . . . RBSn) have two branches (branch A and branch B). For clarity branch A of transceiver system 200c is described first and then a brief discussion is provided about branch B which has essentially the same filter unit as branch A.

As shown in FIG. 5A, the transceiver system 200c includes an antenna 202c' which is coupled to a filter configuration 204c' that in turn is coupled to branch A of multiple RBSs (RBS1, RBS2 . . . RBSn). Each RBS (RBS1, RBS2 . . . RBSn) uses a TX/RX cable 206c and if needed one RX cable 207c to connect to the filter configuration 204c'. To enable the RBSs (RBS1, RBS2 . . . RBSn) so they can share one antenna 202c', each RBS (RBS1, RBS2 . . . RBSn) has a duplex filter 208c incorporated therein. And, the filter configuration 204c' has a unique configuration which in this embodiment includes a diplex-duplex filter 502 and may have a splitter 504 (if there are more than one cosited RBS). A detailed discussion is provided next on how the filter configuration 204c' is configured so as to enable the RBSs (RBS1, RBS2 . . . RBSn) to share one antenna 202c'even if the RBSs (RBS1, RBS2 . . . RBSn) share the same frequency band and/or even if the RBSs (RBS1, RBS2 . . . RBSn) operate with different radio standards (e.g., TDMA, CDMA, WCDMA and GSM).

Referring to the filter components associated with RBS1 and RBS2 shown in the transceiver system 200c, the filter configuration 204c' includes the diplex-duplex filter 502 and the splitter 504. The diplex-duplex filter 502 includes two full-band receiver (RX) filters 506 and 508 and two part-band transceiver (TX) filters 510 and 512. As can be seen, the first full-band RX filter 506 is coupled to the first part-band TX1 filter 510. And, the second full-band RX filter 508 is coupled to the second part-band TX2 filter 512 but is not coupled to the antenna 202c'. The first RBS1 and in particular the duplex filter 208c incorporated therein uses a TX/RX cable 206c to connect to the full-band RX filter 506 and first part-band TX1 filter 510 in the diplex-duplex filter 502. In addition, the first RBS1 also includes a low noise amplifier (LNA) 514 and a coupler 516 that interfaces with the splitter 504 via the RX cable 207c. In this way, the splitter 504 can couple a RX signal received from the full-band RX filter 506 in diplex-duplex filter 502 to the RX filter 508 in diplex-duplex filter 502. The second RBS2 and in particular the duplex filter 208c incorporated therein uses a TX/RX cable 206c to connect to the second full-band RX filter 508 and second part-band TX2 filter 512 in the diplex-duplex filter 502. The second RBS2 also includes a LNA 514. In view of this filter unit, RBS1 can receive a RX signal applied to the antenna 202c' and transmit a TX signal within a TX1 band using the antenna 202c'. Whereas, RBS2 can receive a RX signal applied to the antenna 202c' by way of the splitter 504 and transmit a TX signal within a TX2 band using the antenna 202c'.

For each RBS in addition to RBS1 and RBS2 that is within or added to the transceiver system 200c, the filter configuration 204c' and in particular the diplex-duplex filter 502 would include another full-band receiver (RX) filter 518 (shown as RX filter 518) and another part-band transceiver (TX) filter 520 (shown as TX3 filter 520). The full-band RX filter 518 is coupled to part-band TX3 filter 520 but is not coupled to the antenna 202c'. The additional RBS (shown as RBSn) and in particular the duplex filter 208c incorporated therein uses a TX/RX cable 206c to connect to the diplex-duplex filter 502. The RBSn also includes a LNA 514. In view of this filter unit, RBSn can receive a RX signal applied to the antenna 202c' by way of the splitter 504 and transmit a TX signal within a TX3 band using the antenna 202c'. The same filter scheme associated with filter configuration 204c' is used to make filter configuration 204c" which is associated with branch B of the RBSs (RBS1, RBS2 . . . RBSn) that share antenna 202c".

Referring to FIG. 5B, there is a diagram showing exemplary frequency allocations for each of the antennas 202c' and 202c" in transceiver system 200c. It is possible to see how the RBSs (RBS1, RBS2 . . . RBSn) can share the same frequency band and can operate with different radio standards (e.g., TDMA, CDMA, WCDMA and GSM) simply by selecting the appropriate RX and TX filters. For instance, it can be seen that RBS1 branch A can operate on one standard using TX1 while RBS1 branch B can operate on the same or another standard using TX4. And, it can be seen that RBS1 branch A and RBS1 branch B have RX diversity because both have the same RX band. It can be seen that RBS2 can work in the adjacent band with a different standard.

In comparing transceiver systems 200a and 200c, it should be noted that transceiver system 200c has a lower insertion loss (~1 dB) than transceiver system 200a. Because, the TX signals transmitted from the RBS2s pass through one filter 512 in the transceiver system 200c and pass through two TX filters 312 and 316 in the transceiver system 200a. Also, it should be noted that transceiver system 200c uses one diplex-duplex filter 502 while transceiver system 200a uses a diplex filter 302 and a separate duplex filter 304 per branch.

Figure 6A:
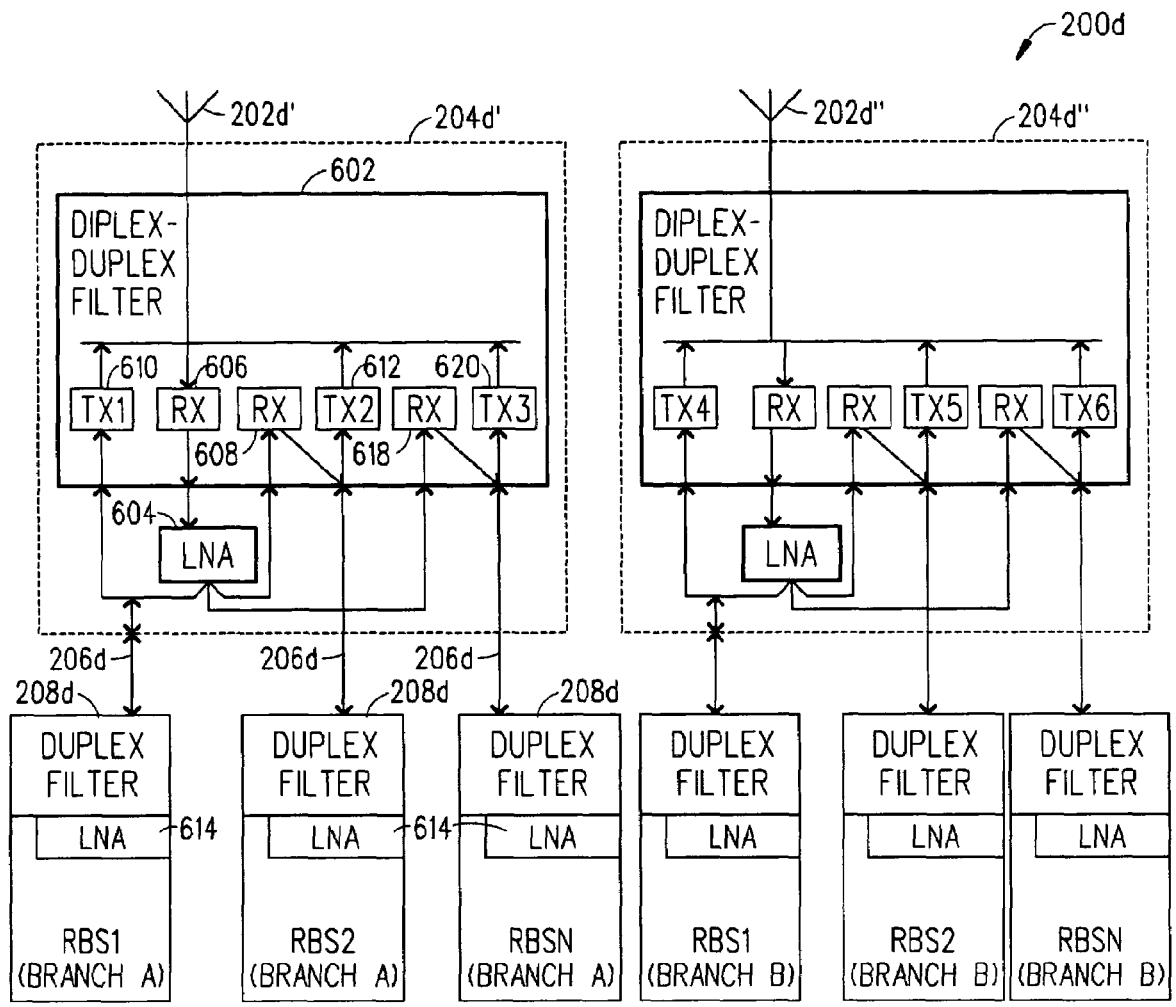
FIG. 6A is a block diagram showing the basic components of a fourth embodiment of the transceiver system shown in FIG. 2 in accordance with the present invention.
Figure 6B:
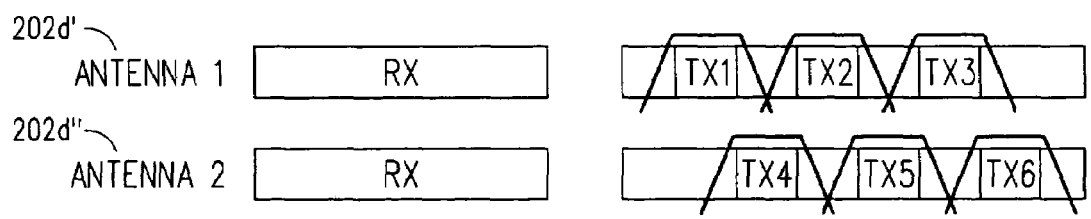
FIG. 6B is a diagram showing exemplary frequency allocations associated with the transceiver system shown in FIG. 6A in accordance with the present invention.

Referring to FIGS. 6A and 6B, there are shown two diagrams associated with the fourth embodiment of the transceiver system 200d in accordance with the present invention. Like in the first three embodiments of the present invention, transceiver system 200d and in particular each of the RBSs (RBS1, RBS2 . . . RBSn) have two branches (branch A and branch B). For clarity branch A of transceiver system 200d is described first and then a brief discussion is provided about branch B which has essentially the same filter unit as branch A.

As shown in FIG. 6A, the transceiver system 200d includes an antenna 202d' which is coupled to a filter unit 204d' that in turn is coupled to branch A of multiple RBSs (RBS1, RBS2 . . . RBSn). Each RBS (RBS1, RBS2 . . . RBSn) uses a TX/RX cable 206d to connect to the filter unit 204d'. To enable the RBSs (RBS1, RBS2 . . . RBSn) so they can share one antenna 202d', each RBS (RBS1, RBS2 . . . RBSn) has a duplex filter 208d incorporated therein. And, the filter unit 204d' has a unique configuration which in this embodiment includes a diplex-duplex filter 602 and may have a low noise amplifier (LNA) 604 with a splitter function. A detailed discussion is provided next on how the filter unit 204d' is configured so as to enable the RBSs (RBS1, RBS2 . . . RBSn) to share one antenna 202d' even if the RBSs (RBS1, RBS2 . . . RBSn) share the same frequency band and/or even if the RBSs (RBS1, RBS2 . . . RBSn) operate with different radio standards (e.g., TDMA, CDMA, WCDMA and GSM).

Referring to the filter components associated with RBS1 and RBS2 shown in the transceiver system 200d, the filter unit 204d' includes the diplex-duplex filter 602, the LNA 604 and a splitter function. The diplex-duplex filter 602 includes two full-band receiver (RX) filters 606 and 608 and two part-band transceiver (TX) filters 610 and 612. As can be seen, the first full-band RX filter 606 is coupled by way of the LNA 604 to the first part-band TX1 filter 610. And, the second full-band RX filter 608 is coupled to the second part-band TX2 filter 612 but is not coupled to the antenna 202d'. The first RBS1 and in particular the duplex filter 208d incorporated therein uses a TX/RX cable 206d to connect to the LNA 604 and the first part-band TX1 filter 610 in the diplex-duplex filter 602. In addition, the first RBS1 also includes a low noise amplifier (LNA) 614. The LNA 604 can couple a RX signal received from the full-band RX filter 606 in diplex-duplex filter 602 to the RX filter 608 in diplex-duplex filter 602. The second RBS2 and in particular the duplex filter 208d incorporated therein uses a TX/RX cable 206d to connect to the second full-band RX filter 608 and second part-band TX2 filter 612 in the diplex-duplex filter 602. The second RBS2 also includes a LNA 614. In view of this filter unit, RBS1 can receive a RX signal applied to the antenna 202d' by way of the LNA 604 and transmit a TX signal within a TX1 band using the antenna 202d'. Whereas, RBS2 can receive a RX signal applied to the antenna 202d' by way of the LNA 604 and transmit a TX signal within a TX2 band using the antenna 202d'.

For each RBS in addition to RBS1 and RBS2 that is within or added to the transceiver system 200d, the filter unit 204d' and in particular the diplex-duplex filter 602 would include another full-band receiver (RX) filter 618 (shown as RX filter 618) and another part-band transceiver (TX) filter 620 (shown as TX3 filter 620). The full-band RX filter 618 is coupled to the LNA 604 and the part-band TX3 filter 620 but is not coupled to the antenna 202d'. The additional RBS (shown as RBSn) and in particular the duplex filter 208d incorporated therein uses a TX/RX cable 206d to connect to the diplex-duplex filter 602. The RBSn also includes a LNA 614. In view of this filter unit, RBSn can receive a RX signal applied to the antenna 202d' by way of the LNA 604 and transmit a TX signal within a TX3 band using the antenna 202d'. The same filter scheme associated with filter unit 204d' is used to make filter unit 204d'which is associated with branch B of the RBSs (RBS1, RBS2 . . . RBSn) that share antenna 202d".

Referring to FIG. 6B, there is a diagram showing exemplary frequency allocations for each of the antennas 202d' and 202d' in transceiver system 200d. It is possible to see how the RBSs (RBS1, RBS2 . . . RBSn) can share the same frequency band and can operate with different radio standards (e.g., TDMA, CDMA, WCDMA and GSM) simply by selecting the appropriate RX and TX filters. For instance, it can be seen that RBS1 branch A can operate on one standard using TX1 while RBS1 branch B can operate on the same or another standard using TX4. And, it can be seen that RBS1 branch A and RBS1 branch B have RX diversity because both have the same RX band. It can be seen that RBS2 can work in the adjacent band with a different standard.

In comparing transceiver systems 200c and 200d, it is noted that transceiver system 200d does not have a coupler 516 and accompanying RX cable 207c in the RBS1 nor does it have the splitter 504 like shown in transceiver system 200c. However, the transceiver system 200d does have an additional active component LNA 604 outside of the RBSs. Moreover, the transceiver system 200d and in particular the RBS1 has a slightly worse RX performance than the RBS1 in transceiver system 200c.

It should be appreciated that in all of the filter configurations described above that a "Tower mounted amplifier" (TMA) (not shown) could be easily incorporated therein if needed. And, in FIGS. 3A and 5A where the filter configurations included a splitter there is however another way of implementing this splitting function and that is to install 2 couplers in the RBS.

It should be understood that certain details and components associated with transceiver systems 200a, 200b, 200c and 200d are well known in the industry. Therefore, for clarity, the description provided above omitted those well known details and components of the transceiver systems $200a$, $200b$, $200c$ and $200d$ that are not necessary to understand the present invention. Lastly, it should be understood that a diplex filter normally filters signals in one band (e.g., 1900 band) from another band (e.g., 800 band). And, a duplex filter filters a TX band from a RX band.

Figure 7:
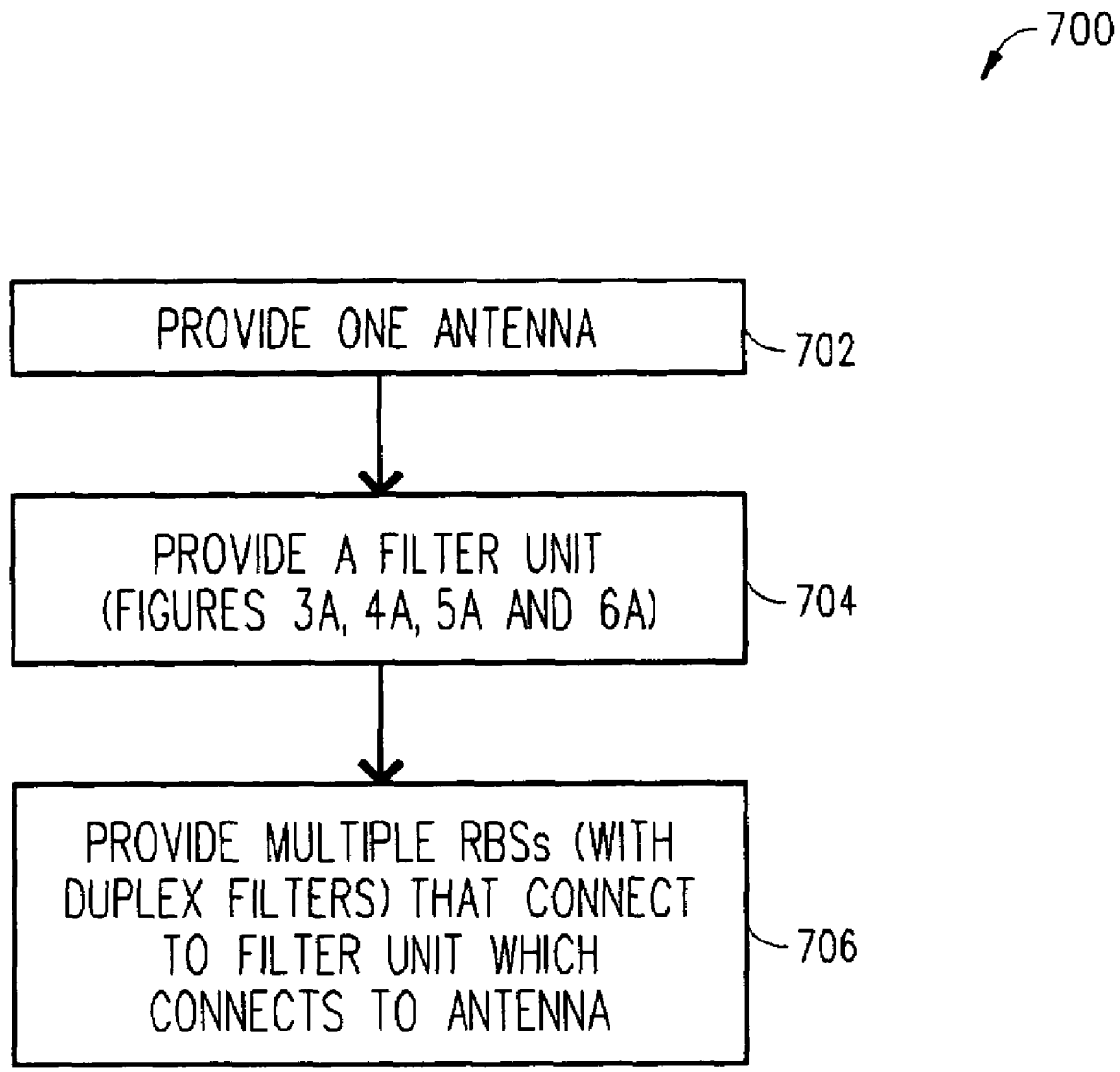
FIG. 7 is a flowchart illustrating the steps of a preferred method for constructing the transceiver system shown in FIGS. 2, 3A, 4A, 5A and 6A in accordance with the present invention.

Referring to FIG. 7, there is a flowchart illustrating the steps of a preferred method 700 for constructing the transceiver system 700 shown in FIGS. 2, 3A, 4A, 5A and 6A in accordance with the present invention. Beginning at step 702, one antenna 202 is provided for each branch of the RBSs used in the transceiver system 200. At step 704, a filter configuration 204 is provided that has a unique combination of diplex filter(s), duplex filter(s), part-band duplex filter(s), diplex-duplex filter(s), splitter(s) and/or LNA(s) (see FIGS. 3A, 4A, 5A and 6A). At step 706, at least two radio base stations RBSs (RBS1, RBS2 . . . RBSn) are provided where each RBS (RBS1, RBS2 . . . RBSn) has a duplex filter 208 incorporated therein. Each RBS (RBS1, RBS2 . . . RBSn) and in particular each duplex filter 208 is coupled to the filter configuration 204 which is configured in a manner that enables all of the RBSs (RBS1, RBS2 . . . RBSn) to share the antenna 202 even if the RBSs (RBS1, RBS2 . . . RBSn) share a frequency band and even if the RBSs (RBS1, RBS2 . . . RBSn) operate with different radio standards (e.g., TDMA, CDMA, WCDMA and GSM). Four exemplary configurations of the filter configuration 204 have been described above with respect to FIGS. 3–6.

Although four embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A transceiver system comprising:
   an antenna;
   a filter unit comprising
      a diplex filter, coupled to said antenna, said diplex filter including;
         a full-band receiver (RX) filter; and
         two part-band transceiver (TX) filters, wherein said full-band RX filter is coupled to a first part-band TX filter; and
      a first duplex filter including
         a TX filter coupled to a second part-band TX filter in said diplex filter; and
         a RX filter; and
   a plurality of radio base stations each of which have a duplex filter incorporated therein all of said plurality of radio base stations being coupled to said filter unit which in turn is coupled to said antenna, wherein said plurality of radio base stations share said antenna if said plurality of radio base stations share a frequency band and/or operate with different radio standards.

2. The transceiver system of claim 1, wherein
   of the plurality of radio base stations a first radio base station having a duplex filter incorporated therein that is coupled to the full-band RX filter and the first part-band TX filter in said diplex filter;
   said first radio base station also interfaces with a splitter that couples a RX signal received from the full-band RX filter in said diplex filter to the RX filter in said first duplex filter; and
   of the plurality of radio base stations a second radio base station having a duplex filter incorporated therein that is coupled to the TX filter and the RX filter in said first duplex filter.

3. The transceiver system of claim 2, further comprising:
   said diplex filter further includes;
   a third part-band transceiver (TX) filter; and
   a second duplex filter that includes:
      a TX filter coupled to the third part-band TX filter in said diplex filter; and
      a RX filter; and
   of the plurality of radio base stations, a third radio base station having a duplex filter incorporated therein that is coupled to the TX filter and the RX filter in said second duplex filter that has the RX filter which receives the RX signal from the splitter.

4. The transceiver system of claim 1, wherein said filter unit includes:
   a part-band duplex filter, coupled to said antenna, said part-band duplex filter includes:
      two part-band receiver (RX) filters; and
      two part-band transceiver (TX) filters, where the first part-band RX filter is coupled to the first part-band TX filter and where the second part-band RX filter is coupled to the second part-band TX filter; and
   of the plurality of radio base stations, a first radio base station having a duplex filter incorporated therein that is coupled to the first part-band RX filter and the first part-band TX filter in said part-band duplex filter; and
   of the plurality of radio base stations, a second radio base station having a duplex filter incorporated therein that is coupled to the second part-band RX filter and the second part-band TX filter in said part-band duplex filter.

5. The transceiver system of claim 4,
   wherein said part-band duplex filter further comprises:
   a third part-band receiver (RX) filter; and
   a third part-band transceiver (TX) filter, where the third part-band RX filter is coupled to the third part-band TX filter; and
   of the plurality of radio base stations, a third radio base station having a duplex filter incorporated therein that is coupled to the third part-band RX filter and the third part-band TX filter in said part-band duplex filter.

6. The transceiver system of claim 1, wherein said filter unit includes:
   a diplex-duplex filter, coupled to said antenna, said diplex-duplex filter including:
      two full-band receiver (RX) filters; and
      two part-band transceiver (TX) filters, where the first full-band RX filter is coupled to the first part-band TX filter and where the second full-band RX filter is coupled to the second part-band TX filter; and
   of the plurality of radio base stations, a first radio base station having a duplex filter incorporated therein that is coupled to the first full-band RX filter and the first part-band TX filter in said diplex-duplex filter: said first radio base station also interfacing with a splitter that couples a RX signal received from the first full-band RX filter to the second full-band PX filter in said diplex-duplex filter, wherein the second full-band RX filter is not connected to said antenna; and
   of the plurality of radio base stations, a second radio base station having a duplex filter incorporated therein that is coupled to the second full-band RX filter and the second part-band TX filter in said diplex-duplex filter.

7. The transceiver system of claim 6,
wherein said diplex-duplex filter further comprises
a third full-band receiver (RX) filter; and
a third part-band transceiver (TX) filter, where the third full-band RX filter is coupled to the third part-band TX filter; and
of the plurality of radio base stations, a third radio base station having a duplex filter incorporated therein that is coupled to the third full-band RX filter and the third part-band TX filter in said diplex-duplex filter, wherein the third full-band RX filter is not connected to said antenna but instead receives the RX signal from the splitter.

8. The transceiver system of claim 1, wherein said filter unit includes:
a diplex-duplex filter, coupled to said antenna, said diplex-duplex filter includes:
two full-band receiver (RX) filters; and
two part-band transceiver (TX) filters, where the second full-band RX filter is coupled to the second part-band TX filter; and
of the plurality of radio base stations, a first radio base station having a duplex filter incorporated therein that is coupled to the first full-band RX filter by way of a low noise amplifier and is also coupled to first part-band TX filter in said diplex-duplex filter;
said low noise amplifier also coupling a RX signal received from the first full-band RX filter to the second full-band RX filter in said diplex-duplex filter, wherein the second full-band RX filter is not connected to said antenna; and
of the plurality of radio base stations, a second radio base station having a duplex filter incorporated therein that is coupled to the second full-band RX filter and the second part-band TX filter in said diplex-duplex filter.

9. The transceiver system of claim 8, further comprising:
said diplex-duplex filter further includes:
a third full-band receiver (RX) filter; and
a third part-band transceiver (TX) filter, where the third full-band RX filter is coupled to the third part-band TX filter; and
of the plurality of radio base stations, a third radio base station having a duplex filter incorporated therein that is coupled to the third full-band RX filter and the third part-band TX filter in said diplex-duplex filter, wherein the third full-band RX filter is not connected to said antenna but instead receives the RX signal from the low noise amplifier.

10. The transceiver system of claim 1, wherein said radio standards include:
time division multiple access (TDMA):
code division multiple access (CDMA):
wide-band division multiple access (WCDMA); and
global system for mobile communication (GSM).

11. A method for constructing a transceiver system comprising the steps of:
providing an antenna;
providing a filter unit wherein said fitter unit includes;
a diplex filter, coupled to said antenna, said diplex filter includes:
a full-band receiver (RX) filter; and
two part-band transceiver (TX) fitters, where said full-band RX filter is coupled to the first part-band TX filter; and
a first duplex filter that includes:
a TX filter coupled to the second part-band TX filter in said diplex filter and a RX filter; and
providing at least two radio base stations, each of which have a duplex filter incorporated therein and all of which are coupled to said filter unit which in turn is coupled to said antenna, wherein said at least two radio base stations share said antenna if said radio base stations share a frequency band and/or operate with different radio standards.

12. The method of claim 11, wherein
of the at least two radio base stations, a first radio base station includes the duplex filter incorporated therein which is coupled to the full-band RX filter and the first part-band TX filter in said diplex filter;
said first radio base station also interfaces with a splitter that couples a RX signal received tram the full-band RX filter in said diplex filter to the RX filter in said first duplex filter; and
of the at least two radio base stations, a second radio base station includes the duplex filter incorporated therein which is coupled to the TX filter and the RX filter in said first duplex filter.

13. The method of claim 12, wherein said step of providing at least two radio base stations includes adding a new radio base station to the at least two radio base stations in which case said diplex filter further includes:
a third part-band transceiver (TX) filter; and
a second duplex filter that includes:
a TX filter coupled to the third part-band TX filter in said diplex filter; and
a RX filter; and
said new radio base station includes a duplex filter incorporated therein which is coupled to the TX filter and the RX filter in said second duplex filter that has the RX filter which receives the RX signal from the splitter.

14. The method of claim 11, wherein said filter unit includes:
a part-band duplex filter,
coupled to said antenna, said part-band duplex filter includes:
two part-band receiver (RX) filters; and
two part-band transceiver (TX) filters, where the first part-band RX filter is coupled to the first part-band TX filter and where the second part-band RX filter is coupled to the second part-band TX filter; and
of the at least two radio base stations, a first radio base station includes the duplex filter incorporated therein which is coupled to the first part-band RX filter and the first part-band TX filter in said part-band duplex filter; and
of the at least two radio base stations, a second radio base station includes the duplex filter incorporated therein which is coupled to the second part-band RX filter and the second part-band TX filter in said part-band duplex filter.

15. The method of claim 14, wherein said step of providing at least two radio base stations includes adding a new radio base station to the at least two radio base stations in which case said part-band duplex filter further includes:
a third part-band receiver (RX) filter; and
a third part-band transceiver (TX) filter, where the third part-band RX filter is coupled to the third part-band TX filter; and
said new radio base station includes a duplex filter incorporated therein which is coupled to the third part-band RX filter and the third part-band TX filter in said part-band duplex filter.

16. The method of claim 11, wherein said filter unit includes:
a diplex-duplex filter, coupled to said antenna, said diplex-duplex filter includes:
two full-band receiver (RX) filters; and
two part-band transceiver (TX) filters, where the first full-band RX filter is coupled to the first part-band TX filter and where the second full-band RX filter is coupled to the second part-band TX filter; and
of the at least two radio base stations, a first radio base station includes the duplex filter incorporated therein which is coupled to the first full-band RX filter and the first part-band TX filter in said diplex-duplex filter;
said first radio base station also interfaces with a splitter that couples a RX signal received from the first full-band RX filter to the second full-band RX filter in said diplex-duplex filter, wherein the second full-band RX filter is not connected to said antenna; and
of the at least two radio base stations, a second radio base station includes the duplex filter incorporated therein which is coupled to the second full-band RX filter and the second part-band TX filter in said diplex-duplex filter.

17. The method of claim 16, wherein said step of providing at least two radio base stations includes adding a new radio base station to the at least two radio base stations in which case said diplex-duplex filter further includes:
a third full-band receiver (RX) fitter; and a third part-band transceiver (TX) filter, where the third full-band RX filter is coupled to the third part-band TX filter; and said new radio base station includes a duplex fitter incorporated therein which is coupled to the third full-band RX filter and the third part-band TX filter in said diplex-duplex filter wherein the third full-band RX filter is not connected to said antenna but instead receives the RX signal from the splitter.

18. The method of claim 11, wherein said filter unit includes:
a diplex-duplex filter, coupled to said antenna, said diplex-duplex filter includes:
two full-band receiver (RX) filters; and
two part-band transceiver (TX) filters, where the second full-band RX filter is coupled to the second part-band TX filter: and
of the at least two rate base stations, a first radio base station includes the duplex filter incorporated therein which is coupled to the first full-band RX filter by way of a low noise amplifier and is also coupled to first part-band TX filter in said diplex-duplex filter:
said low noise amplifier also couples a RX signal received from the first full-band RX filter to the second full-band RX filter in said diplex-duplex filter, wherein the second full-band RX filter is not connected to said antenna; and
of the at least two radio base stations, a second radio base station includes the duplex filter incorporated therein which is coupled to the second full-band RX filter and the second part-band TX filter in said diplex-duplex filter.

19. The method of claim 18, wherein said step of providing at least two radio base stations includes adding a new radio base station to the at least two radio base stations in which case said diplex-duplex filter further includes:
a third full-band receiver (RX) filter; and
a third part-band transceiver (TX) filter, where the third full-band RX filter is coupled to the third part-band TX filter; and
said new radio base station includes a duplex filter incorporated therein which is coupled to the third full-band RX filter and the third part-band TX filter in said diplex-duplex filter, wherein the third full-band RX filter is not connected to said antenna but instead receives the RX signal from the low noise amplifier.

20. The method of claim 11, wherein said radio standards include:
time division multiple access (TDMA);
code division multiple access (CDMA);
wide-band division multiple access (WCDMA); and
global system for mobile communication (GSM).

21. An apparatus for sharing antenna(s) between a plurality of base stations, comprising:
an antenna coupled to
a filter unit comprising:
a diplex filter, coupled to said antenna, said diplex filter includes:
a full-band receiver (RX) filter; and
two part-band transceiver (TX) filters, where said full-band RX filter is coupled to the first part-band TX filter; and
a first duplex filter that includes:
a TX filter coupled to the second part-band TX filter in said diplex filter; and
a RX filter;
wherein the filter unit is coupled to a plurality of duplex filters that are respectively incorporated within a plurality of radio base stations, wherein said radio base stations share said antenna if said radio base stations share a frequency band and/or operate with different radio standards.

22. The apparatus of claim 21, wherein
of the plurality of radio base stations, a first radio base station includes the duplex filter incorporated therein which is coupled to the full-band RX filter and the first part-band TX filter in said diplex filter;
said first radio base station also interfaces with a splitter that couples a RX signal received from the full-band RX filter in said diplex filter to the RX filter in said first duplex filter; and
of the plurality of radio base stations, a second radio base station includes the duplex filter incorporated therein which is coupled to the TX filter and the RX filter in said first duplex filter.

23. The apparatus of claim 22,
said diplex filter further comprises:
a third part-band transceiver (TX) filter; and
a second duplex filter that includes:
a TX filter coupled to the third part-band TX filter in said diplex filter; and
a RX filter; and
of the plurality of radio base stations, a third radio base station includes the duplex filter incorporated therein which is coupled to the TX filter and the RX filter in said second duplex filter that has the RX filter which receives the RX signal from the splitter.

24. The apparatus of claim 21, wherein said filter unit includes:
a part-band duplex filter, coupled to said antenna, said part-band duplex filter includes:
two part-band receiver (RX) filters; and
two part-band transceiver (TX) filters, where the first part-band RX filter is coupled to the first part-band TX filter and where the second part-band RX filter is coupled to the second part-band TX filter; and of the plurality of radio base stations, a first radio base station includes the duplex filter incorporated therein which is coupled to the first part-band RX filter and the first part-band TX filter in said part-band duplex filter; and of the plurality of radio base stations, a second radio base station includes the duplex filter incorporated therein which is coupled to the second part-band RX filter and the second part-band TX filter in said part-band duplex filter.

25. The apparatus of claim 24, further comprising:
said part-band duplex filter further includes:
   a third part-band receiver (RX) filter; and
   a third part-band transceiver (TX) filter, where the third part-band RX filter is coupled to the third part-band TX filter; and includes the duplex filter incorporated therein which is coupled to the third part-band RX filter and the third part-band TX filter in said part-band duplex filter.

26. The apparatus of claim 21, wherein said filter unit includes:
a diplex-duplex filter, coupled to said antenna, said diplex-duplex filter includes:
   two full-band receiver (RX) filters; and
   two part-band transceiver (TX) filters, where the first full-band RX filter is coupled to the first part-band TX filter and where the second full-band RX filter is coupled to the second part-band TX filter; and
of the plurality of radio base stations, a first radio base station includes the duplex filter incorporated therein which is coupled to the first full-band RX filter and the first part-band TX filter in said diplex-duplex filter;
said first radio base station also interfaces with a splitter that couples a RX signal received from the first full-band RX filter to the second full-band RX filter in said diplex-duplex filter, wherein the second full-band RX filter is not connected to said antenna; and
of the plurality of radio base stations, a second radio base station includes the duplex filter incorporated therein which is coupled to the second full-band RX filter and the second part-band TX filter in said diplex-duplex filter.

27. The apparatus of claim 26, further comprising:
said diplex-duplex filter further includes:
   a third full-band receiver (RX) filter; and
   a third part-band transceiver (TX) filter, where the third full-band RX filter is coupled to the third part-band TX filter; and
of the plurality of radio base stations, a said third radio base station includes the duplex filter incorporated therein which is coupled to the third full-band RX filter and the third part-band TX filter in said diplex-duplex filter, wherein the third full-band RX filter is not connected to said antenna but instead receives the RX signal from the splitter.

28. The apparatus of claim 21, wherein said filter unit includes:
a diplex-duplex filter, coupled to said antenna, said diplex-duplex filter includes:
   two full-band receiver (RX) filters; and
   two part-band transceiver (TX) filters, where the second full-band RX filter is coupled to the second part-band TX filter; and
of the plurality of radio base stations, a first radio base station includes the duplex filter incorporated therein which is coupled to the first full-band RX filter by way of a low noise amplifier and is also coupled to a first part-band TX filter of the two part-band transceiver (TX) filters in said diplex-duplex filter;
said low noise amplifier also couples a RX signal received from the first full-band RX filter to a second full-band RX filter of the two full-band receiver (RX) filters in said diplex-duplex filter, wherein the second full-band RX filter is not connected to said antenna; and
of the plurality of radio base stations, a second radio base station includes the duplex filter incorporated therein which is coupled to the second full-band RX filter of the two full-band receiver (RX) filters and the second part-band TX filter of the two part-band transceiver (TX) filters in said diplex-duplex filter.

29. The apparatus of claim 28,
wherein said diplex-duplex filter further comprises:
   a third full-band receiver (RX) filter; and
   a third part-band transceiver (TX) filter, where the third full-band RX filter is coupled to the third part-band TX filter; and
said third radio base station includes the duplex filter incorporated therein which is coupled to the third full-band RX filter and the third part-band TX filter in said diplex-duplex filter, wherein the third full-band RX filter is not connected to said antenna but instead receives the RX signal from the low noise amplifier.

30. The apparatus of claim 21, wherein said radio standards include:
time division multiple access (TDMA);
code division multiple access (CDMA);
wide-band division multiple access (WCDMA); and
global system for mobile communication (GSM).

31. A radio base station comprising:
a duplex filter that is coupled to
a filter unit, which includes a diplex filter, coupled to said antenna, said diplex filter includes:
   a full-band receiver (RX) filter; and
   two part-band transceiver (TX) filters, where said full-band RX filter is coupled to the first part-band TX filter; and
a first duplex filter that includes:
   a TX filter coupled to the second part-band TX filter in said diplex filter; and
   a RX filter,
   wherein the filter unit is coupled to an antenna, wherein another radio base station, which also incorporates a duplex filter is coupled to said filter unit such that said radio base stations can share the antenna if said radio base stations share a frequency band and/or operate with different radio standards.

32. The radio base station of claim 31, wherein
said radio base station includes the duplex filter incorporated therein which is coupled to the full-band RX filter and the first part-band TX filter in said diplex filter;
said radio base station also interfaces with a splitter that couples a RX signal received from the full-band RX filter in said diplex filter to the RX filter in said first duplex filter; and
said another radio base station includes the duplex filter incorporated therein which is coupled to the TX filter and the RX filter in said first duplex filter.

33. The radio base station of claim 31, wherein said filter unit includes:
a part-band duplex filter, coupled to said antenna, said part-band duplex filter includes:
   two part-band receiver (RX) filters; and
   two part-band transceiver (TX) filters, where the first part-band RX filter is coupled to the first part-band TX filter and where the second part-band RX filter is coupled to the second part-band TX filter; and said first radio base station includes the duplex filter incorporated therein which is coupled to the first part RX filter and the first part-band TX filter in said part-band duplex filter; and said another radio base station includes the duplex filter incorporated therein which is coupled to the second part-band RX filter and the second part-band TX filter in said part-band duplex filter.

34. The radio base station of claim 31, wherein said filter unit includes:

a diplex-duplex filter, coupled to said antenna, said diplex-duplex filter includes:

two full-band receiver (RX) filters; and two part-band transceiver (TX) filters, where the first full-band RX filter is coupled to the first part-band TX filter and where the second full-band RX filter is coupled to the second part-band TX filter; and said radio base station includes the duplex filter incorporated therein which is coupled to the first full-band RX filter and the first part-band TX filter in said diplex-duplex filter;

said radio base station also interfaces with a splitter that couples a RX signal received from the first full-band RX filter to the second full-band RX filter in said diplex-duplex filter, wherein the second full-band RX filter is not connected to said antenna; and said another radio base station includes the duplex filter incorporated therein which is coupled to the second full-band RX filter and the second part-band TX filter in said diplex-duplex filter.

35. The radio base station of claim 31, wherein said filter unit includes:

a diplex-duplex filter, coupled to said antenna, said diplex-duplex filter includes:

two full-band receiver (RX) filters; and two part-band transceiver (TX) filters, where the second full-band RX filter is coupled to the second part-band TX filter; and said radio base station includes the duplex filter incorporated therein which is coupled to the first full-band RX filter by way of a low noise amplifier and is also coupled to first part-band TX filter in said diplex-duplex filter;

said low noise amplifier also couples a RX signal received from the first full-band RX filter to the second full-band RX filter in said diplex-duplex filter, wherein the second full-band RX filter is not connected to said antenna; and said another radio base station includes the duplex filter incorporated therein which is coupled to the second full-band RX filter and the second part-band TX filter in said diplex-duplex filter.

36. The radio base station antenna of claim 31, wherein said radio standards include:

time division multiple access (TDMA);

code division multiple access (CDMA);

wide-band division multiple access (WCDMA); and global system for mobile communication (GSM).

* * * * *

UNITED STATES PATENT AND TRADEMARK OFFICE
CERTIFICATE OF CORRECTION

PATENT NO. : 7,120,465 B2
APPLICATION NO. : 10/743555
DATED : October 10, 2006
INVENTOR(S) : Skarby et al.

It is certified that error appears in the above-identified patent and that said Letters Patent is hereby corrected as shown below:

On the Title Page, Item (56), under "U.S. Patent Documents", Line 6, delete "6,895,247 B1" and insert -- 6,895,247 B2 --, therefor.

On the Title Page, Item (56), under "U.S. Patent Documents", Line 1, delete "6,925,312 B1" and insert -- 6,925,312 B2 --, therefor.

In Column 8, Line 31, before "which" delete "204d'" and insert -- 204d" --, therefor.

In Column 8, Line 36, after "and" delete "202d'" and insert -- 202d" --, therefor.

In Column 10, Line 58, in Claim 6, after "diplex-duplex filter" delete ":" and insert -- : --, therefor.

In Column 10, Line 61, in Claim 6, delete "PX" and insert -- RX --, therefor.

In Column 11, Line 51, in Claim 10, after "(TDMA)" delete ":" and insert -- : --, therefor.

In Column 11, Line 52, in Claim 10, after "(CDMA)" delete ":" and insert -- ; --, therefor.

In Column 11, Line 53, in Claim 10, delete "wide-band" and insert -- wideband --, therefor.

In Column 11, Line 58, in Claim 11, delete "fitter" and insert -- filter --, therefor.

In Column 11, Line 62, in Claim 11, delete "fitters" and insert -- filters --, therefor.

In Column 12, Line 14, in Claim 12, delete "tram" and insert -- from --, therefor.

In Column 13, Line 28, in Claim 17, delete "fitter" and insert -- filter --, therefor.

In Column 13, Line 31, in Claim 17, delete "fitter" and insert -- filter --, therefor.

In Column 13, Line 34, in Claim 17, after "filter" insert -- , --.

In Column 13, Line 44, in Claim 18, after "filter" delete ":" and insert -- ; --, therefor.

In Column 13, Line 49, in Claim 18, after "diplex-duplex filter" delete ";" and insert -- : --, therefor.

UNITED STATES PATENT AND TRADEMARK OFFICE
CERTIFICATE OF CORRECTION

PATENT NO. : 7,120,465 B2
APPLICATION NO. : 10/743555
DATED : October 10, 2006
INVENTOR(S) : Skarby et al.

It is certified that error appears in the above-identified patent and that said Letters Patent is hereby corrected as shown below:

In Column 14, Line 11, in Claim 20, delete "wide-band" and insert -- wideband --, therefor.

In Column 15, Line 49, in Claim 27, delete "said" before "third".

Signed and Sealed this

Eighteenth Day of December, 2007

JON W. DUDAS
*Director of the United States Patent and Trademark Office*